United States Patent
Werdecker et al.

(10) Patent No.: US 7,947,335 B2
(45) Date of Patent: May 24, 2011

(54) QUARTZ GLASS COMPONENT WITH REFLECTOR LAYER AND METHOD FOR PRODUCING THE SAME

(75) Inventors: Waltraud Werdecker, Hanau (DE); Rolf Gerhardt, Hammersbach (DE); Juergen Weber, Kleinostheim (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 156 days.

(21) Appl. No.: 12/448,406

(22) PCT Filed: Dec. 13, 2007

(86) PCT No.: PCT/EP2007/063874
§ 371 (c)(1),
(2), (4) Date: Jun. 19, 2009

(87) PCT Pub. No.: WO2008/077807
PCT Pub. Date: Jul. 3, 2008

(65) Prior Publication Data
US 2009/0316268 A1    Dec. 24, 2009

(30) Foreign Application Priority Data

Dec. 22, 2006  (DE) .......................... 10 2006 062 166

(51) Int. Cl.
*B32B 17/06*    (2006.01)
*C23C 4/00*     (2006.01)

(52) U.S. Cl. ........ 427/452; 427/165; 427/579; 428/432; 428/446; 428/701; 428/702; 428/704; 428/332; 428/333; 428/336; 359/599

(58) Field of Classification Search .......................... None
See application file for complete search history.

(56) References Cited

U.S. PATENT DOCUMENTS

| 3,457,102 A | 7/1969 | Grekila et al. |
| 2004/0115352 A1 | 6/2004 | Schultheis et al. |
| 2006/0038470 A1 | 2/2006 | Maul et al. |
| 2008/0075949 A1 | 3/2008 | Kirst et al. |

FOREIGN PATENT DOCUMENTS

| DE | 101 22 718 A1 | 5/2001 |
| DE | 10 2004 051 846 A1 | 3/2006 |
| DE | 10 2004 052 312 A1 | 3/2006 |
| DE | 10 2005 016 732 A1 | 10/2006 |
| JP | 60027676 A | 2/1985 |

OTHER PUBLICATIONS

Espacenet English language abstract for JP 60027676 A published Feb. 12, 1985.
Espacenet English language abstract for DE102005016732 A1 published Oct. 12, 2006.

*Primary Examiner* — Ling Xu
(74) *Attorney, Agent, or Firm* — Tiajoloff and Kelly LLP

(57) ABSTRACT

Methods for producing a quartz glass component with reflector layer are known in which a reflector layer composed of quartz glass acting as a diffuse reflector is produced on at least part of the surface of a substrate body composed of quartz glass. In order, taking this as a departure point, to specify a method which enables cost-effective and reproducible production of uniform $SiO_2$ reflector layers on quartz glass components, it is proposed according to the invention that the reflector layer is produced by thermal spraying by means of $SiO_2$ particles being fed to an energy carrier, being incipiently melted or melted by means of said energy carrier and being deposited on the substrate body. In the case of a quartz glass component obtained according to the method, the $SiO_2$ reflector layer is formed as a layer which is produced by thermal spraying and has an opaque effect and which is distinguished by freedom from cracks and uniformity.

29 Claims, 2 Drawing Sheets

QUARTZ GLASS COMPONENT WITH REFLECTOR LAYER AND METHOD FOR PRODUCING THE SAME

Figure 1:
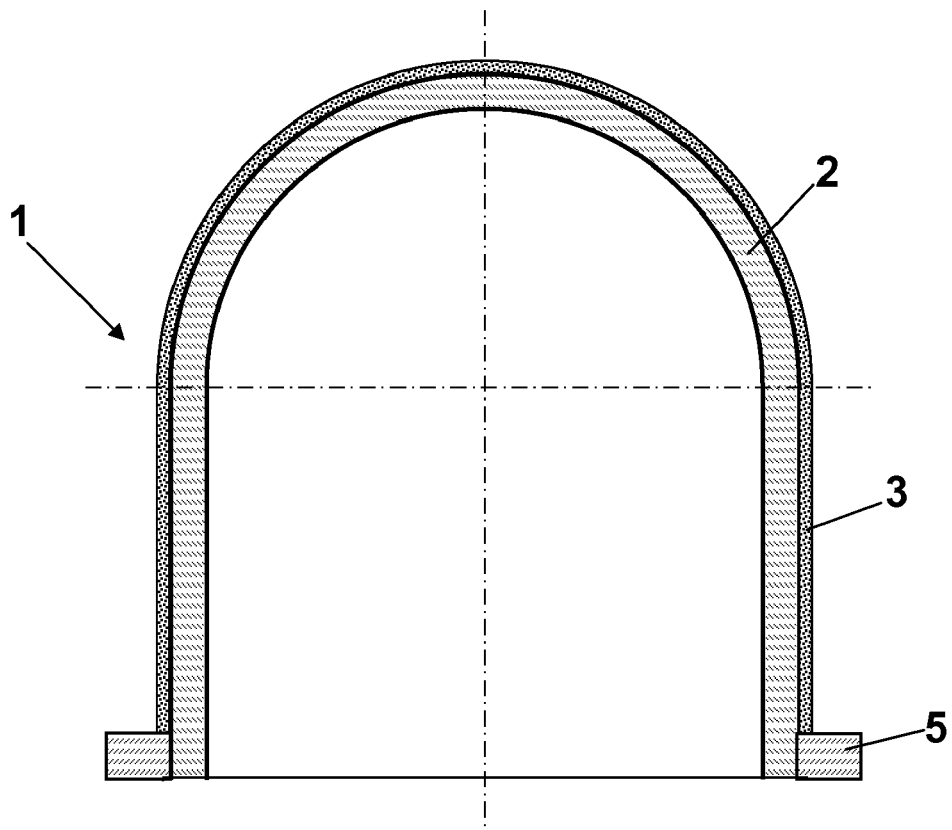

The present invention relates to a method of producing a quartz glass component with a reflector layer, whereby a reflector layer of quartz glass acting as a diffusely reflecting (diffusing) reflector is produced at least on a part of the surface of a substrate body of quartz glass.

Moreover, the present invention is concerned with a quartz glass component with a reflector layer, comprising a substrate body composed of quartz glass having a surface that is covered at least in part with a $SiO_2$ reflector layer acting as a diffusely reflecting (diffusing) reflector.

Components made of quartz glass are used in many applications, e.g. in the manufacture of lamps as cladding tubes, bulbs, covering plates or reflector carriers for lamps and radiators in the ultraviolet, infrared and visible spectral range, in chemical apparatus engineering or semiconductor manufacture in the form of reactors and apparatus made of quartz glass for the treatment of semiconductor components, carrier trays, jars, crucibles, protective shields or simple quartz glass components, such as tubes, rods, plates, flanges, rings or blocks.

In lamps, time constancy and efficiency of the emitted operative radiation play an important role. Likewise in heaters, small heat losses are desired as a rule. To minimize radiation losses, optical radiators and radiant heaters are therefore provided with a reflector. The reflector is firmly connected to the corresponding radiator, or it is a reflector component separated from the radiator.

To reduce transmission or to change the transmitted light wave spectrum, it is known that lamp bulbs are matted, e.g. by etching with acid or by coating the lamp bulb in the interior with a particulate, light-scattering powder, such as a mixture of clay and silica. So far the surfaces of particularly high-quality reflectors, which can be used in a chemically aggressive environment without the reflector material getting damaged or the degree of reflection decreasing noticeably, have consisted of gold. However, reflector layers of gold are expensive and they are resistant to temperature or thermal shock only to a limited degree. Moreover, the reflection depends noticeably on the wavelength and strongly decreases in the UV range.

These drawbacks are avoided by the method for coating quartz glass surfaces for the purpose of changing the reflectivity thereof according to DE 10 2004 051 846, which also shows a reflector and a manufacturing method of the above-mentioned type.

It is suggested in this publication that a diffusely reflecting reflector layer should be made from an at least partly opaque quartz glass. The reflector layer is produced by means of a slip method in which a highly filled, castable aqueous $SiO_2$ slip is produced which contains amorphous $SiO_2$ particles. The amorphous $SiO_2$ particles are produced by wet milling $SiO_2$ granules and have a particle size in the range of up to 500 μm at the most, wherein $SiO_2$ particles with particle sizes in the range between 1 μm and 50 μm account for the largest volume fraction.

The $SiO_2$ slip is applied in the form of a slip layer onto the substrate body of quartz glass, and the slip layer is subsequently dried and vitrified with formation of a more or less opaque quartz glass layer. For the application of the slip layer onto the base body, spraying, electrostatically supported spraying, flow coating, spinning, immersion and dispersion coating are suggested.

The quartz glass layer produced in this way is usable as a diffusing reflector for radiation over a wide wavelength range. However, it has been found that the flow behavior of the known and highly filled slip is not optimally suited for some of the said coating techniques and that, therefore, the reproducible manufacture of a uniform coat is difficult in the individual case. Moreover, a multistage process is here concerned which includes applying the slip layer, drying and vitrification. In all process steps, defects and thus material losses may occur. Shrinkage cracks and mechanical damage to the not yet entirely solidified layer should here particularly be mentioned.

It is therefore the object of the present invention to indicate a method which enables cost-effective and reproducible production of uniform $SiO_2$ reflector layers on quartz glass components.

Moreover, it is the object of the present invention to provide a quartz glass component obtained according to the method, which is distinguished by a crack-free and uniform $SiO_2$ reflector layer.

As for the production method, this object, starting from a method of the aforementioned type is achieved according to the invention in that the reflector layer is produced by thermal spraying in that $SiO_2$ particles are fed to an energy source, are incipiently melted or melted by means of said energy source and deposited on the substrate body.

In the method according to the invention the reflector layer is produced by thermal spraying. $SiO_2$ particles are here supplied in the form of a fluid mass, such as a powder, sol or suspension (dispersion), to an energy source, are melted therein at least in part and flung at a high speed onto the prepared substrate body surface to the coated. The energy source is normally an oxy-fuel gas flame or a plasma jet, but may also be configured as an electric arc, laser beam, or the like.

It is important that the $SiO_2$ particles should be melted or incipiently melted and deposited on the substrate body without an entirely transparent surface layer being formed without an adequate degree of reflection, which layer would then be useless as a reflector layer for diffuse reflection. Transparence limited to portions of the reflector layer is however acceptable and may even be desired, for instance for sealing surface areas. Opacity of the layer reduced by transparence can also be compensated by a larger layer thickness.

In the method according to the invention the substrate body surface is coated and the layer is solidified in one single operation. This avoids the problems accompanying the known method because of the multi-stage procedure thereof and also possible damage to a layer that has not solidified yet. To be more specific, cracks caused by shrinkage do not occur.

It has been found that with the help of the method according to the invention it is possible to produce a $SiO_2$ surface layer which shows an opaque effect, firm adhesion and uniform density, which is particularly crack-free and which is additionally distinguished by adhesive strength and is suited as a diffusing reflector for radiation over a wide range of wavelengths.

An adequate softening of the $SiO_2$ particles takes place at a temperature that can be reached with the help of both a low-energy flame spraying or electric arc spraying method and a high-energy plasma spraying method.

Therefore, it is intended in a first preferred variant of the method that the reflector layer is produced by plasma spraying, with a plasma jet or a laser beam being used as the energy source.

Plasma spraying enables a comparatively high energy input and high speeds when the melted or incipiently melted $SiO_2$ particles are flung against the substrate body surface. As a result, relatively thick and firmly adhering reflector layers can be produced within a short period of time.

As a rule, the $SiO_2$ particles are supplied to the plasma flame in the form of a powder or in the form of a suspension (suspension plasma spraying; SSP). Apart from this, the so-called SPPS (solution precursor plasma spraying) method is also possible, wherein precursor compounds are supplied to the plasma flame for $SiO_2$ synthesis and oxidation into $SiO_2$ takes place in the plasma flame or during deposition on the substrate body surface. In the SSP method particularly fine particles can be used, which facilitates the manufacture of thin layers, e.g. of a finishing dense layer used for sealing.

Alternatively and in an equally advantageous way, the reflector layer is produced by flame spraying, with an electric arc or an oxy-fuel gas flame being used as the energy source.

In flame spraying methods, temperature control can be carried out more easily than in plasma spraying methods, so that a predetermined opacity of the reflector layer must be observed in an exact and reproducible way. Moreover, this method is distinguished by a low energy input into the substrate body.

It has turned out to be useful when the $SiO_2$ particles have particle sizes in the range of up to not more than 200 µm, preferably not more than 100 µm, where $SiO_2$ particles with particle sizes in the range between 1 µm and 60 µm account for the largest volume fraction.

Reflector layers consist in general of a plurality of thermally sprayed layers of $SiO_2$ particles. When $SiO_2$ particles are used with particle sizes above 200 µm, thin reflector layers are hardly producible on the one hand and there is the risk on the other hand that the particles cannot absorb enough energy from the energy source within the short available heating-up period, whereby the sintering of the layer is rendered difficult. By contrast, small particles of less than 1 µm are difficult to handle and tend to clog injection nozzles, burner nozzles or other types of nozzles.

Particularly preferably, the $SiO_2$ particles have a particle size distribution which is distinguished by a $D_{50}$ value of less than 50 µm, preferably less than 40 µm, particularly preferably less than 30 µm.

As for the opacity of the reflector layer to be observed, it is possible to sinter the $SiO_2$ particles without a complete and transparent fusing together and, if possible, without deformation of the substrate body. Particles in the above-mentioned range of sizes show an advantageous sintering behavior in this respect. They exhibit a high sintering activity and therefore sinter already at a comparably low temperature in the case of which, on the one hand, substance transport processes backed by plastic deformation, which could effect a particularly fast vitrification into transparent quartz glass, do not take place to a considerable extent yet, and where also the substrate body is not or not considerably impaired.

In this connection it has also turned out to be advantageous when the $SiO_2$ particles have a multimodal particle size distribution, with a first maximum of the size distribution in the range of 2 µm and 6 µm and a second maximum in the range of 20 µm to 60 µm.

Preferably, at least one third of the $SiO_2$ particles are made spherical.

It has been found that spherical particles after opaque sintering contribute to high reflection, above all in the infrared wavelength range.

In a particularly preferred variant of the method, the $SiO_2$ particles are supplied to the energy source in the form of granules in which the $SiO_2$ particles are agglomerated into granulate particles having sizes in the range of from 2 µm to 300 µm, but preferably less than 100 µm.

As for $SiO_2$ particles fixed in granulate form, handling, particularly supply to the energy source, is facilitated. This is particularly true for very finely divided $SiO_2$ particles with particle sizes of less than 30 µm, which are particularly well suited for performing the method according to the invention.

Furthermore, it has turned out to be useful when the $SiO_2$ content of the $SiO_2$ particles is at least 99.9% by wt.

This start material does not present any risk of contamination or crystallization. The content of impurities is preferably less than 1 wt ppm.

In a particularly preferred development of the method, a reflector layer is produced with a layer thickness in the range between 50 µm and 3000 µm, preferably in the range between 100 µm and 800 µm.

The thicker the $SiO_2$ reflector layer is made, the more complete is the reflection of radiation. Moreover, in applications requiring a high density of the reflector layer, e.g. in order to prevent sealing or the generation of particles out of the layer, the accompanying reduced opacity of the layer is compensated by a larger thickness. Reflector layers with a layer thickness of more than 3000 µm can however only be produced by taking great efforts and the additional effect of the larger layer thickness is hardly noticed as a rule (in the case of substantially opaque layers). By contrast in the case of $SiO_2$ reflector layers with thicknesses below 50 µm, it is difficult to observe a predetermined diffuse reflection in a reproducible way since small differences in the opacity of the layer already show a noticeable impact on the degree of reflection.

Especially for the manufacture of large layer thicknesses a procedure is preferred in which a plurality of successive layer plies are applied for generating the reflector layer.

For the manufacture of reflector layers with specific properties, either the $SiO_2$ particles are provided with a dopant or, apart from the $SiO_2$ particles, a dopant is supplied to the energy source.

The reflector layer produced in this way contains one or several dopants that can give the reflector component an additive functionality adapted to the specific purpose of use or can simplify the manufacture thereof. Examples of this are adaptation of the reflection and thermal insulation by a dopant with a selective absorption in a specific wavelength range, increased lifetime due to a dopant increasing the viscosity of quartz glass, improvement of the chemical resistance or reduced risk of contamination presented by the component and, specifically in a plasma method, improved coupling in of the plasma by a dopant absorbing radiation in the range of the main emission wavelength of the plasma.

A further advantageous application is achieved with the use of a dopant that is volatile at a high temperature.

At a temperature in the range of the sintering temperature of the reflector layer or in the range of the operative temperature of the energy source the volatile dopant evaporates, sublimes or dissociates with formation or release of a gas. The gas passes into the reflector layer and facilitates the generation and maintenance of a high opacity.

One or more of the compounds selected from the group consisting of $ZrO_2$, $Al_2O_3$, $ZrSiO_4$, oxide, carbide or nitride compounds of the rare-earth metals, SiC and $Si_3N_4$ are used as preferred dopants.

The dopants may be distributed in the layer in a uniform way, or they may be contained in concentrated form in separate layer plies, e.g. in intermediate layers.

Likewise, layers with a concentration gradient of dopant are suited. An addition of aluminum in the quartz glass will form $Al_2O_3$ in the reflector layer, which enhances etch resistance and temperature stability of quartz glass and thus prolongs the service life of the coated quartz glass component. Additions of nitrogen or carbon which are incorporated in the form of nitrides or carbides into the quartz glass structure and effect a stiffening of the glass structure and thus e.g. improved etch resistance show a similar action. $Si_3N_4$ may easily decompose at elevated temperatures, thereby facilitating the setting of a high opacity in the reflector layer through the formation of gases.

Preferably, the $SiO_2$ particles are amorphous.

The use of $SiO_2$ particles that are amorphous right from the start reduces the risk of crystal formation in the preparation of the reflector layer production, which may lead to waste of the component coated in this way.

It has turned out to be advantageous when the $SiO_2$ particles are produced from silicon-containing precursor compounds, preferably from precursor compounds additionally containing nitrogen.

Suitable start substances for $SiO_2$ containing precursor compounds are e.g. TEOS or siloxanes. Silazanes additionally contain nitrogen. Owing to the incorporation of nitrogen into the quartz glass of the reflector layer the thermal stability thereof is increased and etch resistance is improved.

With respect to this, particular preference is given to a procedure in which thermal spraying is carried out in the presence of a nitrogen-containing gas, particularly in the presence of $NH_3$ or $N_2O$.

Thermal spraying can e.g. be carried out with the help of a plasma flame as the energy source and with supply of the nitrogen-containing gas to the plasma flame. This treatment is particularly well suited also as a final treatment for producing a nitrogen-containing surface layer.

As for the quartz glass component with reflector layer, the above-indicated object starting from a component of the above-indicated type is achieved according to the invention in that the $SiO_2$ reflector layer is formed as a layer which is produced by thermal spraying and shows an opaque action.

The quartz glass component according to the invention comprises a reflector layer composed of doped or undoped quartz glass that is produced by thermal spraying and is opaque either entirely or in part. The opaque quartz glass acts as a diffusing optical reflector.

The component is preferably used in the manufacture of process reactors, lamps or reflectors, and it is present in the form of a tube, bulb, a chamber, shell, spherical or ellipsoidal segment, plate, heat shield, or the like. The quartz glass component is either part of an optical radiator or a heating reactor with integrated reflector, the latter being formed by the $SiO_2$ cover layer, or the component forms a separate reflector and is used in combination with an optical radiator or heating reactor.

The quartz glass component is obtained by means of the method according to the invention and, in addition to its opacity, the reflector layer is distinguished by high adhesion strength, high homogeneity of its optical properties, particularly action as a diffusing layer, which is predominantly determined by a uniform pore distribution, by a uniformly high density and by an excellent chemical and thermal resistance, mechanical strength and high thermal shock resistance. What should particularly be noted is its absence of cracks and a uniform density distribution.

It is suited as a diffusing reflector for radiation over a wide range of wavelengths. The opacity of the reflector layer is noticed in that the direct spectral transmission in the wavelength range between 200 nm and 2500 nm is below 2%.

With respect to the material of the substrate body the $SiO_2$ reflector layer preferably consists of species-specific material. "Species-specific" in this instance means that the $SiO_2$ content of the glass mass differs from that of the substrate body by not more than 1% by wt., preferably by not more than 0.1% by wt. With the use of "species-specific material", it becomes possible to approximate the thermal expansion coefficients of the quartz glass of the component and of the reflector layer as much as possible, resulting in particularly high adhesion at the same time.

Advantageous developments of the quartz glass component according to the invention become apparent from the sub-claims. Insofar as developments of the component indicated in the sub-claims copy the procedures indicated in sub-claims regarding the method of the invention, reference is made to the above observations regarding the corresponding method claims for a supplementary explanation. The designs of the quartz glass component according to the invention as outlined in the remaining sub-claims shall be explained in more detail hereinafter.

In a preferred embodiment of the quartz glass component of the invention, the substrate body is configured as a cladding body of quartz glass for receiving a radiation emitter.

The cladding body of quartz glass is here enveloping a radiation emitter, such as a heating coil, a carbon ribbon or a radiation-emitting gas filling, and at the same time part of the cladding body is provided with the diffusely reflecting $SiO_2$ reflector layer. The $SiO_2$ cover layer is here provided on the outside of the cladding body facing away from the radiation emitter, whereby impairment of the radiation emitter or the atmosphere inside the cladding body is avoided.

The $SiO_2$ reflector layer has a reflection coefficient of at least 0.6, preferably at least 0.8, in the wavelength range of 1000 nm to 2000 nm.

Reflection coefficient means the intensity ratio of the radiation vertically impinging on the reflector, to the reflecting radiation. An Ulbricht sphere is suited for measuring the diffusely reflecting radiation.

When high-purity synthetic $SiO_2$ start material is used, a high degree of reflection in the UV wavelength range is also achieved.

Figure 2:
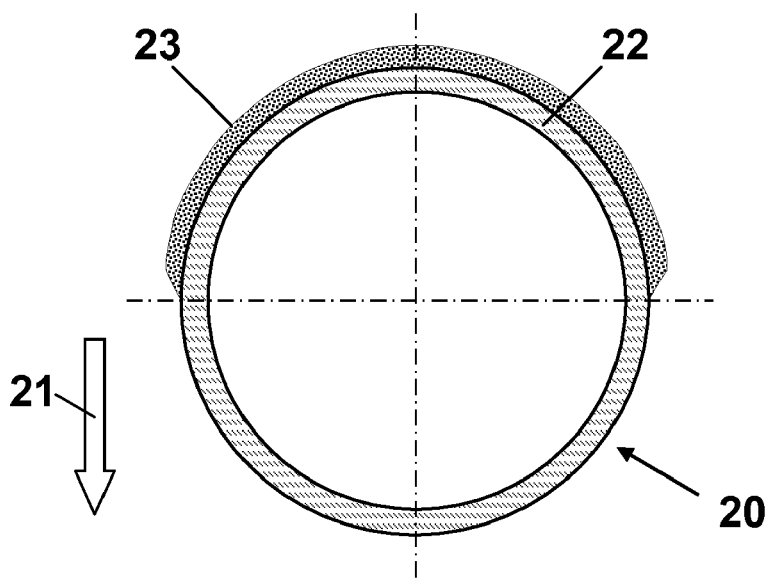
Figure 3:
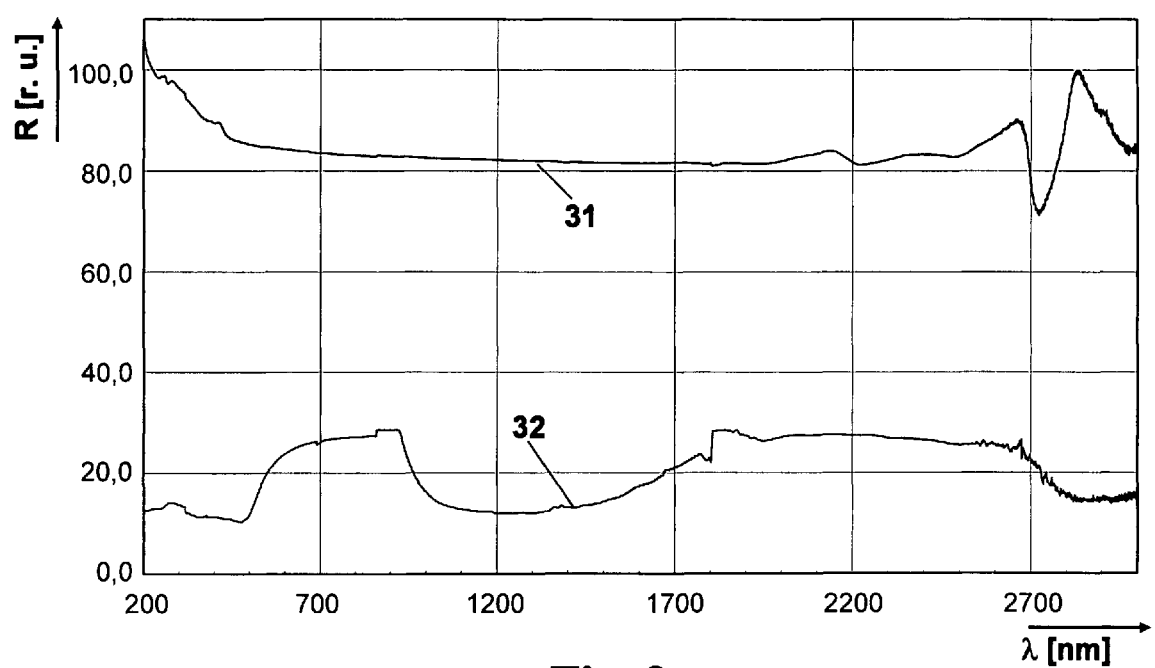

The invention shall now be explained in more detail in the following with reference to embodiments and a drawing. The drawing is a schematic illustration which shows in detail in FIG. 1 a reactor for the treatment of wafers, the outer wall of the reactor being formed by a layer of opaque quartz glass, in a view onto the front side;

FIG. 2 a cladding tube of quartz glass for an optical radiator, the outer cylindrical surface of the tube being coated with a reflector layer of opaque quartz glass; and FIG. 3 a reflection curve for the reflector layers shown in FIGS. 1 and 2.

FIG. 1 is a schematic view of and a longitudinal section through a dome-shaped reactor 1, as is used for etching processes or CVD processes in semiconductor fabrication.

The reactor 1 consists of a dome-shaped base body 2 composed of transparent quartz glass, which is provided with an outer layer 3 of opaque quartz glass and the bottom side of which has provided thereon a flange 5 of opaque quartz glass.

The quartz glass reactor has an outer diameter of 420 mm, a height of 800 mm and a wall thickness of 4 mm. The outer layer 3 is manufactured by means of thermal spraying, as shall be explained in detail further below. The thickness of the outer layer 3 is about 350 μm. It exhibits a high diffuse reflection over a wide wavelength range and, in contrast to gold reflector layers, it can also be used on a reactor 1 if said reactor is inductively heated. A gold reflector layer would here be destroyed immediately by the coupled-in energy.

With this application, attention must particularly be paid to the IR reflection characteristics, for the heat should not radiate to the outside, but remain inside the reactor 1 to reduce the consumption of energy and the temperature load on the surrounding facility parts and to achieve a temperature distribution as homogeneous as possible inside the reactor 1.

The manufacture of the outer layer 3 shall now be explained by way of example in more detail with reference to the method according to the invention.

The layer substrate of the base body 2 is sandblasted and then cleaned in 30% hydrofluoric acid to remove other surface impurities, particularly alkali and alkaline-earth compounds.

A powder of synthetic $SiO_2$ is prepared, which consists of spherical, amorphous $SiO_2$ primary particles having a mean grain size of about 50 µm. The $SiO_2$ primary particles are mixed together with 2% by wt. of silicon nitride powder ($\alpha$-$Si_3N_4$) and are dispersed in VE water. After setting a liter weight of 1310 g and a viscosity of 150 mPas the suspension is centrifugally atomized by means of a conventional spray drier. Spherical $SiO_2$ spray granules are here obtained with a size distribution distinguished by a $D_{50}$ value of 32 µm and by a pore volume of 0.6 g/l and a mean pore radius of about 20 nm. After drying at 400° C. the granules are thermally consolidated by heating to 800° C.

The granules are processed in a vacuum plasma spraying plant with Ar—$H_2$ plasma and a plasma power of 45 kW on the base body 2 as an opaque outer layer 3. The added $Si_3N_4$ is here decomposed into $SiO_2$ and nitrogen-containing gases that are partly entrapped in the granulate grains and prevent dense sintering and transparence of the grains. The porosity achieved in this way makes a major contribution to the diffuse reflection of the outer layer 3 produced.

FIG. 2 schematically shows a radial cross-section of a cladding tube 20 for an excimer radiator for use in the UV wavelength range. The main radiation direction of the cladding tube 20 is oriented downwards in the embodiment and is symbolized by directional arrow 21. A reflector in the form of an opaque coating 23 is formed at a thickness of about 1 mm on the upper side 22 of the cladding tube 20 facing away from the main propagation direction 21, the fabrication of said coating being now explained in more detail hereinafter.

The layer substrate of the cladding tube 20 is sandblasted and subsequently cleaned in 30% hydrofluoric acid to eliminate surface impurities, particularly alkali and alkaline earth compounds.

A powder mixture of synthetic $SiO_2$ is prepared, the mixture being composed of spherical amorphous $SiO_2$ particles with a bimodal grain size distribution 50% by weight of the powder consist of $SiO_2$ particles with a mean grain size of about 15 µm, and 50% by wt. consist of $SiO_2$ particles with a mean grain size of about 40 µm. The powder mixture is applied by combustion flame spraying using an acetylene-oxygen combustion mixture on the upper side 22 of the cladding tube 20 as an opaque coating 23. The surface of the cladding tube is here about 150 mm away from the spraying nozzle.

FIG. 3 shows the reflection behavior of the diffusing reflector produced according to Example 2 (FIG. 2) in the form of an opaque $SiO_2$ opaque layer in the wavelength range of 200 nm to 2800 nm. The reflection degree "R" in %, based on the diffuse reflection of "Spektralon" is here plotted on the y-axis of the diagram, and the wavelength $\lambda$ of the operative radiation in nm on the x-axis. The reflection is measured by means of an Ulbricht sphere.

Curve 31 shows the reflection behavior with a $SiO_2$ opaque layer of a thickness of 350 µm in comparison with a gold layer with a thickness of 1 mm on a quartz glass substrate body (curve 32). It can be seen that the $SiO_2$ opaque layer of undoped $SiO_2$ in the wavelength range between about 200 nm and 2100 nm has an approximately uniform degree of reflection R above 80%. The diffuse reflection is always higher in this wavelength range than the diffuse reflection of the gold coating as is presently used (it must however be borne in mind that the gold coating also produces a portion of specular reflection). At 200 nm the diffuse reflection of the $SiO_2$ opaque layer is above the comparative standard used (Spektralon), and it must be expected that this is also true for the even more short-wave VUV range. However, there has been no established method for measuring the diffuse reflection for the VUV range.

This high reflection in the deep-UV range offers the possibility of using the component according to FIG. 2 also for UV lamps, for instance in the UV sterilization sector.

The invention claimed is:

1. A method of producing a quartz glass component said method comprising:
    producing by thermal spraying a reflector layer of quartz glass configured to act as a diffusely reflecting reflector on at least a part of a surface of a substrate body of quartz glass;
    said thermal spraying including supplying amorphous $SiO_2$ particles, of which at least a third are spherical, to an energy source, said $SiO_2$ particles being partly or fully fused by said energy source and deposited on the substrate body.

2. The method according to claim 1, wherein the reflector layer is produced by plasma spraying, and the energy source comprises a plasma jet or a laser beam.

3. The method according to claim 1, wherein the reflector layer is produced by flame spraying and the energy source comprises an electric arc or an oxy-fuel gas flame.

4. The method according to claim 1, wherein the $SiO_2$ particles have particle sizes in a range up to but not more than 200 µm, wherein the $SiO_2$ particles with particle sizes ranging between 1 µm and 60 µm represent a majority of volume of the $SiO_2$ particles.

5. The method according to claim 4, wherein the $SiO_2$ particles have a particle size distribution that has a $D_{50}$ value of less than 50 µm.

6. The method according to claim 4, wherein the $SiO_2$ particles have a particle size distribution that has a $D_{50}$ value of less than 40 µm.

7. The method according to claim 1, wherein the $SiO_2$ particles are supplied to the energy source in the form of granules in which the $SiO_2$ particles are agglomerated into granulate particles having sizes in a range of from 2 µm to 300 µm.

8. The method according to claim 1, wherein the $SiO_2$ content of the $SiO_2$ particles is at least 99.9% by wt.

9. The method according to claim 1, wherein the reflector layer is produced with a thickness between 50 µm and 3000 µm.

10. The method according to claim 1, wherein several successive layer plies are applied so as to produce the reflector layer.

11. The method according to claim 1, wherein the $SiO_2$ particles are provided with a dopant or the dopant is supplied to the energy source separately from the $SiO_2$ particles.

12. The method according to claim 11, wherein said dopant is volatile at a high temperature.

13. The method according to claim 12, wherein the dopant comprises one or more compounds selected from the group consisting of $ZrO_2$, $Al_2O_3$, $ZrSiO_4$, oxide, carbide, and or nitride compounds of the rare-earth metals, SiC and $Si_3N_4$.

14. The method according to claim 1, wherein the $SiO_2$ particles are produced from silicon-containing precursor compounds.

15. The method according to claim 1, wherein the thermal spraying is carried out in the presence of a nitrogen-containing gas.

16. The method according to claim 1, wherein the reflector layer is produced with a thickness between 100 μm and 800 μm.

17. The method according to claim 1, wherein the thermal spraying is carried out in the presence of $NH_3$ or $N_2O$.

18. A quartz glass component comprising: a substrate body composed of quartz glass having a surface that is covered at least in part with a $SiO_2$ reflector layer configured to act as a diffusely reflecting reflector, wherein the $SiO_2$ reflector layer is formed as a layer produced by thermal spraying and said $SiO_2$ reflector layer exhibits an opaque action defined by a reflection coefficient of at least 0.6 in the wavelength range of 1000 nm to 2000 nm.

19. The component according to claim 18, wherein the $SiO_2$ content of the $SiO_2$ reflector layer is at least 99.9% by wt.

20. The component according to claim 18, wherein the reflector layer has a layer thickness between 50 μm and 3000 μm.

21. The component according to claim 18, wherein the reflector layer is composed of a plurality of successive layer plies.

22. The component according to 18, wherein the $SiO_2$ reflector layer contains at least one dopant that in quartz glass produces an optical absorption in the ultraviolet, visible or infrared spectral range.

23. The component according to claim 18, wherein the $SiO_2$ reflector layer contains at least one dopant selected from the group consisting of $ZrO_2$, $Al_2O_3$, $ZrSiO_4$, oxide, carbide, and nitride compounds of the rare-earth metals, SiC and $Si_3N_4$.

24. The component according to claim 23, wherein the dopants are contained in separate layer plies or in layers with a concentration gradient of the dopant.

25. The component according to claim 18, wherein the substrate body is configured as a cladding body of quartz glass for receiving a radiation emitter.

26. The component according to claim 18, wherein the $SiO_2$ reflector layer has a reflection coefficient of at least 0.8 in the wavelength range of 1000 nm to 2000 nm.

27. The component according to claim 18, wherein the $SiO_2$ reflector layer consists of synthetic $SiO_2$.

28. The component according to claim 18, wherein the $SiO_2$ reflector layer contains nitrogen at least in a near-surface area.

29. The component according to claim 18, wherein the reflector layer has a thickness between 100 μm and 800 μm.

* * * * *